(12) United States Patent
Marcuse et al.

(10) Patent No.: US 6,462,856 B1
(45) Date of Patent: Oct. 8, 2002

(54) METHOD AND APPARATUS FOR MODULATING AN OPTICAL SIGNAL USING POLARIZATION

(75) Inventors: Dietrich Marcuse, Lincroft, NJ (US); Herman Melvin Presby, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/584,543

(22) Filed: May 31, 2000

(51) Int. Cl.[7] .......................... G02F 1/09; G02F 1/295; G01R 31/00; G01R 33/02
(52) U.S. Cl. ..................... 359/280; 359/281; 359/283; 359/284; 324/96; 324/244.1; 385/6; 385/11; 250/227.17
(58) Field of Search .................... 359/246, 280, 359/281, 283, 484, 485, 284; 385/4, 11, 6, 8, 12, 16, 41; 250/227.17; 324/96, 117 R, 244.1; 356/365

(56) References Cited

U.S. PATENT DOCUMENTS

| | | | | | |
|---|---|---|---|---|---|
| 3,609,008 A | * | 9/1971 | Dillon, Jr. | ................... | 359/283 |
| 4,027,948 A | * | 6/1977 | Tanton et al. | ............... | 359/283 |
| 4,236,782 A | * | 12/1980 | Castera et al. | ................. | 385/6 |
| 4,236,783 A | * | 12/1980 | Hepner et al. | ................ | 385/41 |
| 4,731,581 A | * | 3/1988 | Doriath et al. | ........... | 324/244.1 |
| 4,947,107 A | * | 8/1990 | Doerfler et al. | ............... | 324/96 |
| 5,479,094 A | * | 12/1995 | Esman et al. | ................. | 324/96 |
| 5,553,173 A | * | 9/1996 | Lutz et al. | .................... | 385/11 |
| 5,568,049 A | * | 10/1996 | Bucholtz | ................ | 324/244.1 |

* cited by examiner

Primary Examiner—Loha Ben
(74) Attorney, Agent, or Firm—Ryan, Mason & Lewis, LLP

(57) ABSTRACT

A low-rate data transmission system and method are disclosed that use the Faraday effect to modulate the polarization state of light traveling in an optical fiber. The resulting change in polarization is used to communicate information over the fiber. The low-rate data transmission system includes a low-rate signal source producing current in a wire coil wrapped around an optical fiber. Information is conveyed in accordance with the present invention by the selectively introducing a polarization change into the light carried by the fiber. Generally, the source light at the input of the optical fiber can be randomly polarized and information is conveyed in accordance with the present invention by the presence or absence of a predefined polarization introduced into the light. The longitudinal magnetic field produced by a current in the coil rotates the plane of polarization of the light, in accordance with the well-known Faraday effect. When the current in the coil is modulated by the signal source, the resulting change in polarization communicates information over the fiber.

17 Claims, 1 Drawing Sheet

METHOD AND APPARATUS FOR MODULATING AN OPTICAL SIGNAL USING POLARIZATION

FIELD OF THE INVENTION

The invention is directed toward the field of optical communications, and more particularly, to a method and apparatus for modulating an optical communication signal using a magnetic field to adjust polarization properties.

BACKGROUND OF THE INVENTION

Communication networks are used to transfer information, such as data, voice, text or video information, among communication devices, such as telephones, computer terminals, multimedia workstations, and videophones, connected to the networks. A network typically comprises nodes connected to each other, and to communication devices, by various links. Each link is typically characterized by a bandwidth or link capacity.

Most recent developments in communication technologies have been motivated by a desire to increase available bandwidth of networks to ever increasing levels. Many applications, however, do not require channels having such high bit rates. Applications that utilize an additional channel for low data rate communications, such as applications that transmit monitoring-or status information on a side channel, do not fully utilize the available bandwidth. Thus, to use a full rate channel for such low data rate communications is an inefficient use of the available bandwidth. A need therefore exists for a method and apparatus for modulating an optical communication signal at low data rates. A further need exists for a low rate communication system that supplements an existing high bandwidth system by superimposing additional lower data rate information by modulating the high bandwidth signal.

SUMMARY OF THE INVENTION

Generally, a low-rate data transmission system and method are disclosed that use the Faraday effect to modulate the polarization state of a source light traveling in an optical fiber. The resulting change in polarization is used to communicate additional information over the fiber. The low-rate data transmission system includes a low-rate signal source producing current in a wire coil wrapped around an optical fiber.

Information is conveyed in accordance with the present invention by the selective introduction of a polarization change into the light carried by the fiber. Generally, the source light at the input of the optical fiber can be randomly polarized and information is conveyed in accordance with the present invention by the presence or absence of a predefined polarization introduced into the light. A bit of information can be conveyed, for example, by selectively producing a current in the coil and introducing a predefined polarization in the light in the optical fiber.

The longitudinal magnetic field produced by a current in the coil rotates the plane of polarization of the light, in accordance with the well-known Faraday effect. When the current in the coil is modulated by the signal source, the resulting change in polarization communicates information over the fiber. According to the Faraday effect, the plane of polarization of light is rotated through an angle, Θ, when transmitted through a material in a direction parallel to the magnetic field.

A more complete understanding of the present invention, as well as further features and advantages of the present invention, will be obtained by reference to the following detailed description and drawings.

DETAILED DESCRIPTION

Figure 1:
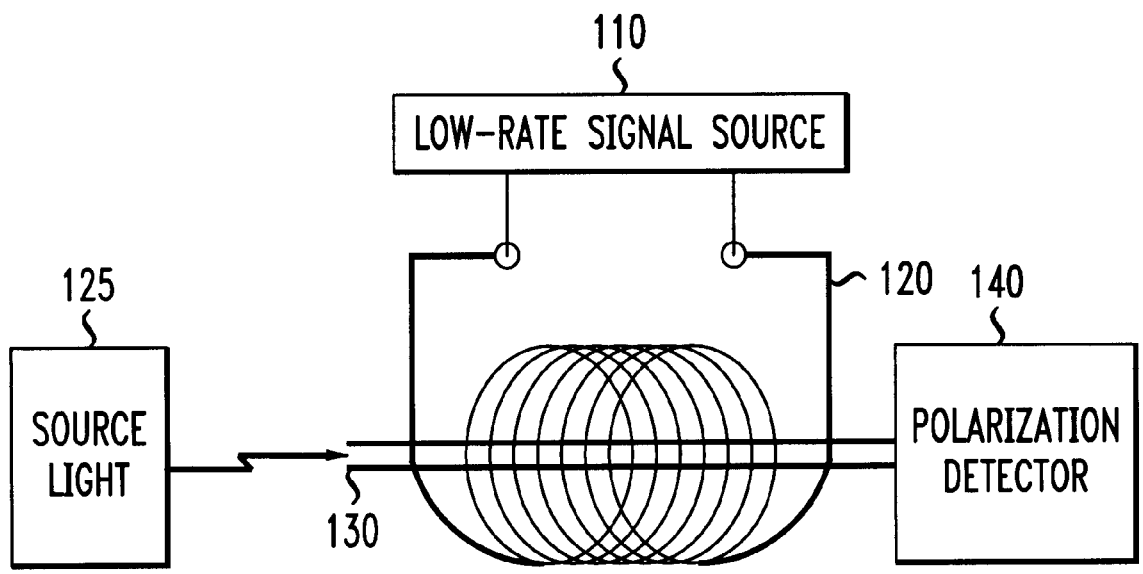
FIG. 1 illustrates a low-rate data transmission system in accordance with the present invention.

FIG. 1 illustrates a low-rate data transmission system 100 in accordance with the present invention. According to one feature of the present invention, the Faraday effect is used to modulate the polarization state of a source light 125 traveling in an optical fiber 130. The resulting change in polarization is used to communicate information over the fiber 130. As shown in FIG. 1, the low-rate data transmission system 100 includes a low-rate signal source 110 producing current in a wire coil 120 wrapped around an optical fiber 130. The source light 125 may be an information carrying signal that is further modulated in accordance with the present invention to convey additional information.

Generally, the source light at the input of the optical fiber 130 can initially be randomly polarized and information is conveyed in accordance with the present invention by the presence or absence of a predefined polarization introduced into the light. As used herein, polarization means the orientation of the electric field of the propagating light with respect to the axis of propagation. A random polarization is an arbitrary (i.e., not predefined), but definite polarization state, that may be rotated to a desired polarization state in accordance with the present invention. The presence or absence of a predefined polarization in the light may be detected, for example, using a polarization detector 140.

As discussed further below, a change in polarization is obtained by varying a magnetic field in the vicinity of the optical fiber 130. For example, to convey a data value of binary one (1), the low-rate signal source 110 will produce a current in the coil 120 and thereby introduce a predefined polarization in the light in the optical fiber 130. Likewise, a data value of binary zero (0) can be conveyed if the low-rate signal source 110 does not produce a current in the coil 120, to maintain the random polarization of the source light in the optical fiber 130.

In an alternate implementation, a known polarization state can be introduced into the source light using a polarizer (not shown), then changing the polarization state to a second polarization.

The longitudinal magnetic field produced by a current in the coil 120 has the potential of rotating the plane of polarization of the light. This effect is referred to as the Faraday effect. When the current in the coil 120 is modulated by the signal source 110, the resulting change in polarization can be used to communicate information over the fiber 130. More specifically, according to the Faraday effect, the plane of polarization of light is rotated through an angle, Θ, when transmitted through glass in a direction parallel to the magnetic field.

The amount of rotation is given by:

$$\Theta = VHL,$$

where:

V=Verdet constant of the fiber 130;
H=field strength; and
L=length of the fiber 130 situated in the field, H.

The magnetic field, H, in the coil 120 is related to the current, I, by the following expression:

$$H \cdot L = N \cdot I,$$

where N is the number of turns in the coil and I is the current flowing through the coil. Thus, $$\Theta = V \cdot N \cdot I.$$

It is noted that the Verdet constant is proportional to the ability of the material to rotate the polarization of light traveling through the material. Thus, an optical fiber 130 consisting essentially of quartz has a significant Verdet constant, which can be used to rotate the polarization of light traversing the fiber. For comparison, the following materials have the indicated Verdet constant, V:

| Material | Verdet constant, V |
| --- | --- |
| quartz | 0.0166 min of arc gauss$^{-1}$ cm$^{-1}$ |
| water | 0.013 min of arc gauss$^{-1}$ cm$^{-1}$ |
| air | 6.27 × 10$^{-6}$ min of arc gauss$^{-1}$ cm$^{-1}$ |
| KDP | 0.2 min of arc gauss$^{-1}$ cm$^{-1}$ |

If additional current is needed to obtain a desired rotation angle, a transformer can be utilized. Specifically, the secondary winding of a transformer can drive the wire coil 120, and the primary winding of the transformer (not shown) could contain as many turns of wire as needed. Since no real power is required to change the polarization state of light, the amount of power that is dissipated depends entirely on the resistivity of the wires in the coil 120 and the transformer. In theory, a large current can be driven through a low-impedence coil with a relatively modest amount of power applied to the transformer.

It is to be understood that the embodiments and variations shown and described herein are merely illustrative of the principles of this invention and that various modifications may be implemented by those skilled in the art without departing from the scope and spirit of the invention.

We claim:

1. A method of transmitting information through an optical fiber carrying a source light, said source light having an initial polarization state, said method comprising the steps of:
   wrapping a coil around said optical fiber; and
   selectively applying a current to said coil to introduce a polarization change in said source light to convey said information.

2. The method of claim 1, wherein said initial polarization state is a random polarization.

3. The method of claim 1, wherein said information is conveyed by the presence or absence of a predefined polarization introduced into the light.

4. The method of claim 1, wherein a longitudinal magnetic field produced by said current in said coil rotates the plane of polarization of said source light.

5. The method of claim 1, further comprising the step of detecting a polarization state in said source light to recover said signal.

6. The method of claim 1, wherein said source light is an information carrying signal.

7. An optical system for transmitting information through an optical fiber carrying a source light, said source light having an initial polarization state, comprising:
   a wire coil wrapped around said optical fiber; and
   a signal source for selectively introducing a current in said coil to introduce a polarization change in said source light to convey said information.

8. The optical system of claim 7, wherein said initial polarization state is a random polarization.

9. The optical system of claim 7, wherein said information is conveyed by the presence or absence of a predefined polarization introduced into said source light.

10. The optical system of claim 7, wherein a longitudinal magnetic field produced by said current in said coil rotates the plane of polarization of said source light.

11. The optical system of claim 7, further comprising a detector for detecting a polarization state in said source light to recover said signal.

12. The optical system of claim 7, wherein said source light is an information carrying signal.

13. A method of transmitting information through an optical fiber, said method comprising the steps of:
   generating a source light having an initial polarization state in said optical fiber; and
   selectively applying a magnetic field to said optical fiber to introduce a polarization change in said source light to convey said information.

14. The method of claim 13, wherein said initial polarization state is a random polarization.

15. The method of claim 13, wherein said information is conveyed by the presence or absence of a predefined polarization introduced into the light.

16. The method of claim 13, further comprising the step of detecting a polarization state in said source light to recover said signal.

17. The method of claim 13, wherein said source light is an information carrying signal.

* * * * *